United States Patent
Janssen

(10) Patent No.: US 9,954,999 B2
(45) Date of Patent: *Apr. 24, 2018

(54) SYSTEM AND METHOD FOR TELEPHONE OPERATION IN QUIET MODE

(71) Applicant: VTech Telecommunications Limited, Tai Po, New Territory (HK)

(72) Inventor: Holger Janssen, Richmond (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/853,704

(22) Filed: Sep. 14, 2015

(65) Prior Publication Data
US 2016/0006859 A1    Jan. 7, 2016

Related U.S. Application Data

(63) Continuation of application No. 12/164,806, filed on Jun. 30, 2008, now Pat. No. 9,137,351, which is a continuation of application No. 10/771,307, filed on Feb. 5, 2004, now Pat. No. 7,397,908.

(51) Int. Cl.
| | |
|---|---|
| *H04M 1/66* | (2006.01) |
| *H04M 1/725* | (2006.01) |
| *H04M 19/04* | (2006.01) |
| *H04W 8/22* | (2009.01) |
| *H04M 1/663* | (2006.01) |

(52) U.S. Cl.
CPC ... *H04M 1/72566* (2013.01); *H04M 1/72502* (2013.01); *H04M 1/72577* (2013.01); *H04M 19/04* (2013.01); *H04W 8/22* (2013.01); *H04M 1/663* (2013.01)

(58) Field of Classification Search
CPC ......... H04M 1/72566; H04M 1/72577; H04M 1/72552; H04M 3/42382; H04M 2207/18; H04W 8/22
See application file for complete search history.

(56) References Cited

U.S. PATENT DOCUMENTS

| | | |
|---|---|---|
| 5,317,632 A | 5/1994 | Ellison |
| 5,696,497 A | 12/1997 | Mottier et al. |
| 5,812,648 A | 9/1998 | Wanner |
| 6,002,763 A | 12/1999 | Lester et al. |
| 7,088,990 B1 | 8/2006 | Isomursu et al. |
| 7,127,242 B1 | 10/2006 | Olson |

(Continued)

FOREIGN PATENT DOCUMENTS

| | | |
|---|---|---|
| DE | 19645751 | 5/1997 |
| DE | 19737126 | 3/1999 |

(Continued)

*Primary Examiner* — Oleg Asanbayev
(74) *Attorney, Agent, or Firm* — Steptoe & Johnson LLP

(57) ABSTRACT

A method and system for automatically changing the operation of signaling features in a telephone are disclosed. In one embodiment, a method includes: storing, in a first handset of a telephone system, quiet mode settings that specify a start time and an end time for a quiet mode signaling feature; wirelessly transmitting, from the first handset of the telephone system to a second handset of the telephone system, the quiet mode settings that specify the start time and the end time for the quiet mode signaling feature; and updating quiet mode settings for the quiet mode signaling feature in the second handset in response to receiving quiet mode settings from the first handset, and wherein the first handset and the second handset of the telephone system self-check the status of their quiet mode settings.

16 Claims, 15 Drawing Sheets

(56) References Cited

U.S. PATENT DOCUMENTS

| | | |
|---|---|---|
| 7,248,885 B2 | 7/2007 | Benco et al. |
| 2001/0053692 A1 | 12/2001 | Ito et al. |
| 2003/0100336 A1 | 5/2003 | Cronin |
| 2003/0186676 A1 | 10/2003 | Ogman et al. |
| 2004/0110498 A1 | 6/2004 | Wang |
| 2004/0235520 A1 | 11/2004 | Cadiz et al. |
| 2004/0259536 A1 | 12/2004 | Keskar et al. |
| 2005/0075096 A1 | 4/2005 | Aljuraid |
| 2005/0285934 A1 | 12/2005 | Carter |

FOREIGN PATENT DOCUMENTS

| | | |
|---|---|---|
| DE | 10013902 | 9/2001 |
| DE | 10054979 | 5/2002 |
| DE | 20206119 | 9/2002 |
| EP | 0831329 | 8/1997 |
| GB | 2323245 | 9/1998 |
| GB | 2346033 | 7/2000 |
| GB | 2393779 A1 | 6/2004 |
| GB | 2404311 | 1/2005 |
| JP | 05276108 A1 | 10/1993 |
| WO | WO 97/28631 | 8/1997 |
| WO | WO 00/39985 | 7/2000 |
| WO | WO 01/17209 | 3/2001 |

SYSTEM AND METHOD FOR TELEPHONE OPERATION IN QUIET MODE

CROSS-REFERENCE TO RELATED APPLICATIONS

This application is a continuation of U.S. patent application Ser. No. 12/164,806, filed Jun. 30, 2008, now U.S. Pat. No. 9,137,351, which is a continuation of U.S. patent application Ser. No. 10/771,307, filed Feb. 5, 2004, now U.S. Pat. No. 7,397,908, which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure relates generally to telephone systems. More particularly, the present disclosure relates to a method for automatically adjusting the level of signals (e.g., telephone ringer, voice announce device, keypad tone, or answering machine) associated with a telephone system in accordance with a preset time period.

BACKGROUND

The typical noise levels associated with a home environment vary significantly over the course of a day, as well as between weekdays and weekends. In a typical household, the pattern of noise variation may be quite regular. During daytime hours, many sources, including children at play, television programs, road traffic, appliance operation, and background music, contribute to a high level of noise. During the day, a high volume for a telephone ringer or answering machine is appropriate, in order to ensure that an occupant is alerted to an incoming call or a message. At night, ambient noise is significantly reduced, and sounds associated with the telephone become increasingly obtrusive to the occupants, especially during sleep hours.

In order to minimize the disturbance associated with nighttime calls, some users resort to changing the ringer volume every evening and morning. However, users may often forget to adjust the ringer in the morning, leading, for instance, to missed telephone calls during the day. In addition, most households have more than one telephone, typically several, each of which typically has its own dedicated ringer volume control. In order to minimize noise at night a user might have to travel throughout a house adjusting each of many phones. In addition to a ringer, many telephone systems have other features which alert a user by emitting sound or other signals, including call-screening features, voice announce features, answering machines, and error tones associated with a keypad. Manually disabling and enabling all such signaling devices and machines (hereafter referred to as "signaling features") on a daily basis for several telephones would be extremely cumbersome.

In light of the foregoing discussion it will be appreciated that a need exists for a more convenient method to automatically adjust the sound levels associated with a telephone system, to accommodate a user's lifestyle.

SUMMARY

The present disclosure relates to controlling a telephone system. More particularly, the disclosure relates to a method and device for automatically changing the output of one or more signaling features associated with the telephone system during daily operation.

In one embodiment, a method includes: storing, in a first handset of a telephone system, quiet mode settings that specify a start time and an end time for a quiet mode signaling feature; wirelessly transmitting, from the first handset of the telephone system to a second handset of the telephone system, the quiet mode settings that specify the start time and the end time for the quiet mode signaling feature; and updating quiet mode settings for the quiet mode signaling feature in the second handset in response to receiving quiet mode settings from the first handset, and wherein the first handset and the second handset of the telephone system self-check the status of their quiet mode settings.

In another embodiment, a system includes telephone system, including: a first telephone and a second telephone using a common telephone number. The first telephone includes: a user interface configured to receive quiet mode settings that specify a start time and an end time for a quiet mode, and receive a request to transmit the quiet mode settings to the second telephone; and a communication interface configured to wirelessly transmit the quiet mode settings in a single transmission to the second telephone in response to the received request. The second telephone includes: a receiver configured to receive the quiet mode settings from the first telephone; and a clock configured to trigger and terminate the quiet mode based on the received quiet mode settings in the single transmission. The first handset and the second handset of the telephone system self-check the status of their quiet mode settings.

In one still embodiment, a method includes: receiving, with a first telephone of a telephone system, input that requests quiet mode settings to be wirelessly transmitted to a second telephone of the telephone system; wirelessly transmitting, from the first telephone to the second telephone, first quiet mode settings for a first signaling feature of a second telephone, and second quiet mode settings for a second signaling feature of the second telephone in response to said receiving input; in response to receiving the first quiet mode settings, configuring the first signaling feature of the second telephone per the first quiet mode settings; and in response to receiving the second quiet mode settings, configuring the second signaling feature of the second telephone per the second quiet mode settings, wherein the first handset and the second handset of the telephone system self-check the status of their quiet mode settings.

In yet another embodiment, a method for enabling automatic control of operation of signaling features is disclosed. A user selects from a programmable menu in a machine associated with the telephone system, a start time corresponding to the time at which the user desires for the telephone system to enter a "quiet mode", that is, the time at which the desired signaling features are to be disabled or lowered in intensity. A user further selects from the menu an end time of quiet mode operation, corresponding to the time of day at which the telephone system is to resume "regular mode" operation with the intensity of all signaling devices at a higher, "normal", level. In addition, the user selects from among a plurality of signaling features, the feature(s) whose signaling function is to be turned off or lowered in intensity during the period of quiet mode operation. Finally, user activates the telephone system for quiet mode operation, so that the signaling intensity of the desired signaling features is automatically lowered upon arrival of the start time. For example, if a "quiet night" is set to begin at 9:00 pm, the telephone ringer and voice alert could be automatically programmed to become silent each evening at 9:00 o'clock. At the end time, for example, 8:00 am, the ringer and voice alert would be restored to their full volume.

An embodiment of the present disclosure includes a telephone system programmable to automatically switch between operation in a regular mode and quiet mode according to the time of day. The telephone system may be associated with one or more telephone numbers. The telephone system includes necessarily at least one signaling device and preferably a plurality of signaling devices. In one embodiment, the system comprises a plurality of machines and devices, which may include, but is not limited to, telephones, answering machines, voice announce machines, speaker phones, and cordless handsets. An individual machine such as a telephone handset or base station may further comprise more than one signaling device, including a ringer, keypad tone, error tone, visible light flasher, or vibrating device. Preferably, each telephone handset and base station contains a memory that is used to store information and instructions, as well as a processor and a controller chip used to execute stored instructions. Preferably, each handset and base station further contains a user interface and display through which data and instructions, such as parameters associated with quiet mode operation, can be entered, deleted, or modified. Preferably, the telephone system includes an internal clock, which triggers the telephone system to enter or exit from quiet mode operation. In one embodiment, a plurality of devices, including each telephone handset, voice announce device, and answering machine can communicate with each other to exchange data, including, but not limited to time and status information.

In another embodiment, a method is disclosed for establishing quiet mode operation in a plurality of machines and devices associated with a telephone system, by sending instructions from a single device. This allows a user, for example to program many devices within the phone system with a common set of quiet mode operating instructions, without having to enter the instructions individually within each device that the user wishes to program. In one embodiment, a user enters a set of quiet mode program instructions in a programmable menu of a first device that is capable of distributing information. For example, a user may program quiet mode on a first device and subsequently select other devices within the telephone system to which the quiet mode settings shall be applied.

In one embodiment, a user first programs quiet mode operation on a base station. The user then prompts the base station to forward the quiet night settings to each cordless handset by Radio Frequency (RF) transmission. Each handset, in turn, may be configured to adopt (as a default setting) or ignore the quiet night settings transmitted from the base station.

In another embodiment, after a user programs quiet mode on the base station, whenever the base station detects a mode change (e.g. become silent or restore full volume) the base forwards the new settings to the handsets.

In an alternative embodiment of the present disclosure, a user programs quiet mode operation directly through an interface located on a handset. The latter embodiment provides the ability to tailor quiet mode settings for each individual handset located in a home.

DETAILED DESCRIPTION

Figure 1:
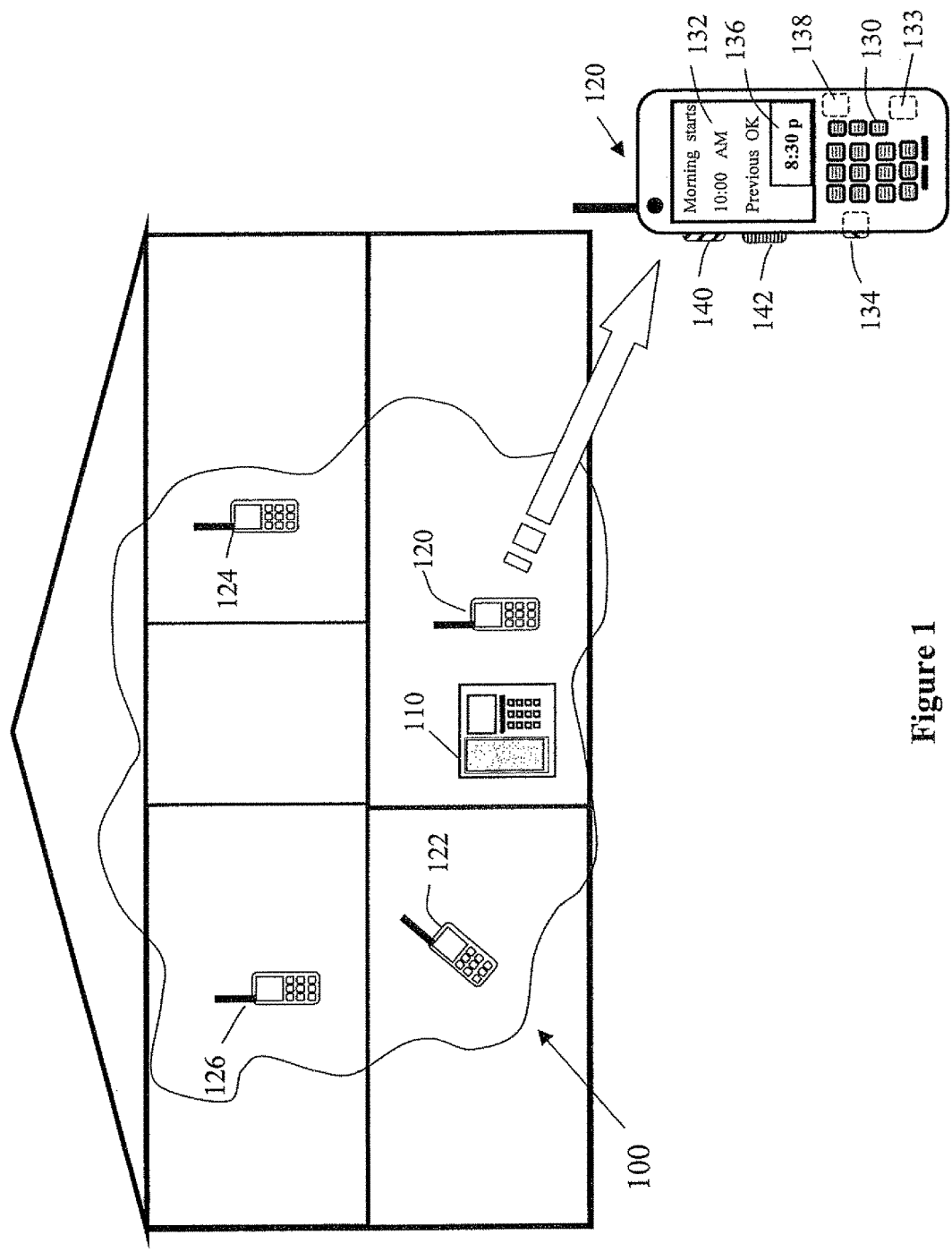
FIG. 1 is a depiction of a quiet mode telephone system according to an embodiment.

Before one or more embodiments of the disclosure are described in detail, one skilled in the art will appreciate that the disclosure is not limited in its application to the details of construction, the arrangements of components, and the arrangement of steps set forth in the following detailed description or illustrated in the drawings. The disclosure is capable of other embodiments and of being practiced or being carried out in various ways. For instance, although embodiments disclosed herein are directed towards the operation of devices associated with a phone system, embodiments of the present disclosure associated with other signaling devices in a home, such as doorbells, and intercoms are anticipated. Also, it is to be understood that the phraseology and terminology used herein is for the purpose of description and should not be regarded as limiting.

Embodiments relate to a system and method for automatically switching a device into and out of a quiet mode operation, preferably at regular intervals. In one embodiment, a telephone system is provided with a user-programmable menu, including choices related to the operation of signaling features associated with the telephone system.

FIG. 1 illustrates telephone system 100, including base station 110 and handsets 120, 122, 124, and 126 located in different rooms in a house. In one embodiment, telephones 120, 122, 124, and 126, as well as base station 110, each preferably contains a keypad 130 for entering instructions to program operation of the telephone system 100, as well as to dial telephone numbers. Also included in each telephone handset and base station, as illustrated for telephone 120, is a screen 132 for displaying and viewing information, and a memory 133 to store programs and information related to quiet mode operation. Processor 134 and clock 136 are also located within each telephone and base station. Preferably, a set of solid state time-keeping circuits that keep time for clock 136 are in electrical communication with processor 134. Preferably, although not necessarily, the "face" of the clock may be displayed within screen 132, as illustrated in FIG. 1. In a preferred embodiment, each handset and base station further includes a communication chip 140 and receiver 142, for transmitting information between telephone system devices. Preferably, system 100 includes a menu-driven program for controlling operation of signaling devices associated with system 100. The program can be stored in one or more of handsets 120, 122, 124, 126 and base station 110.

Figure 2:
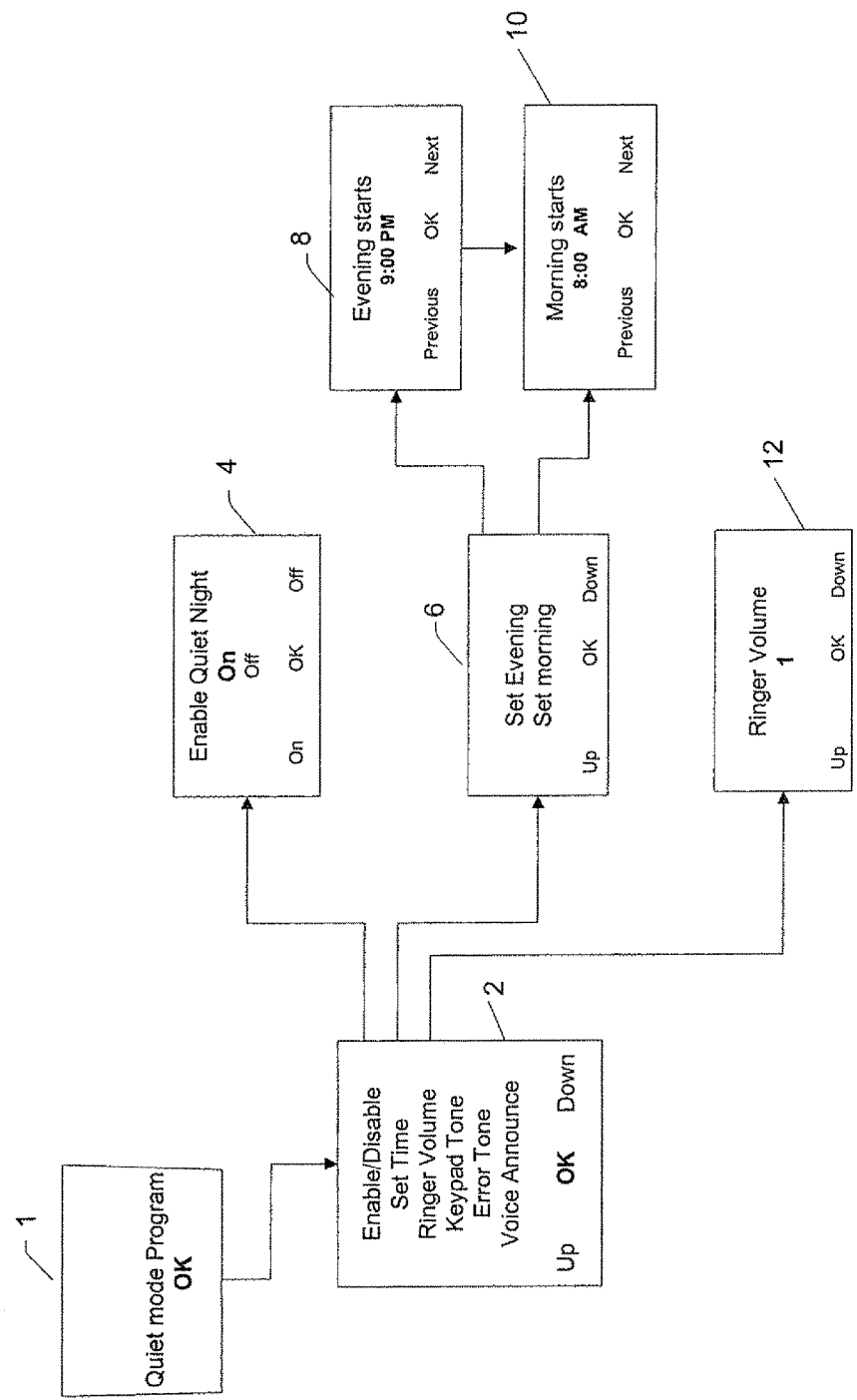
FIG. 2 is a depiction of a program for setting quiet mode operation according to one embodiment.

FIG. 2 illustrates one embodiment for programming the quiet mode operation for handset 120. After selecting handset 120, the user chooses QUIET MODE PROGRAM from menu 1 in screen 132. The user is then provided with a general menu 2 containing choices related to quiet mode operation. General menu 2 offers the user a set of options, including, for example, ENABLE/DISABLE, a SET TIME option, and other options related to signaling devices associated with the telephone system.

Selection of SET TIME option in menu 2, prompts menu 6 to appear. Menu 6 includes the options SET EVENING and SET MORNING, whose selection leads the user into menus, 8 and 10, respectively.

Menu 8 provides for the user to select the time at which telephone handset 120 is to enter quiet mode operation.

Menu 10 provides for selection of the time for terminating quiet mode operation.

Figure 3:
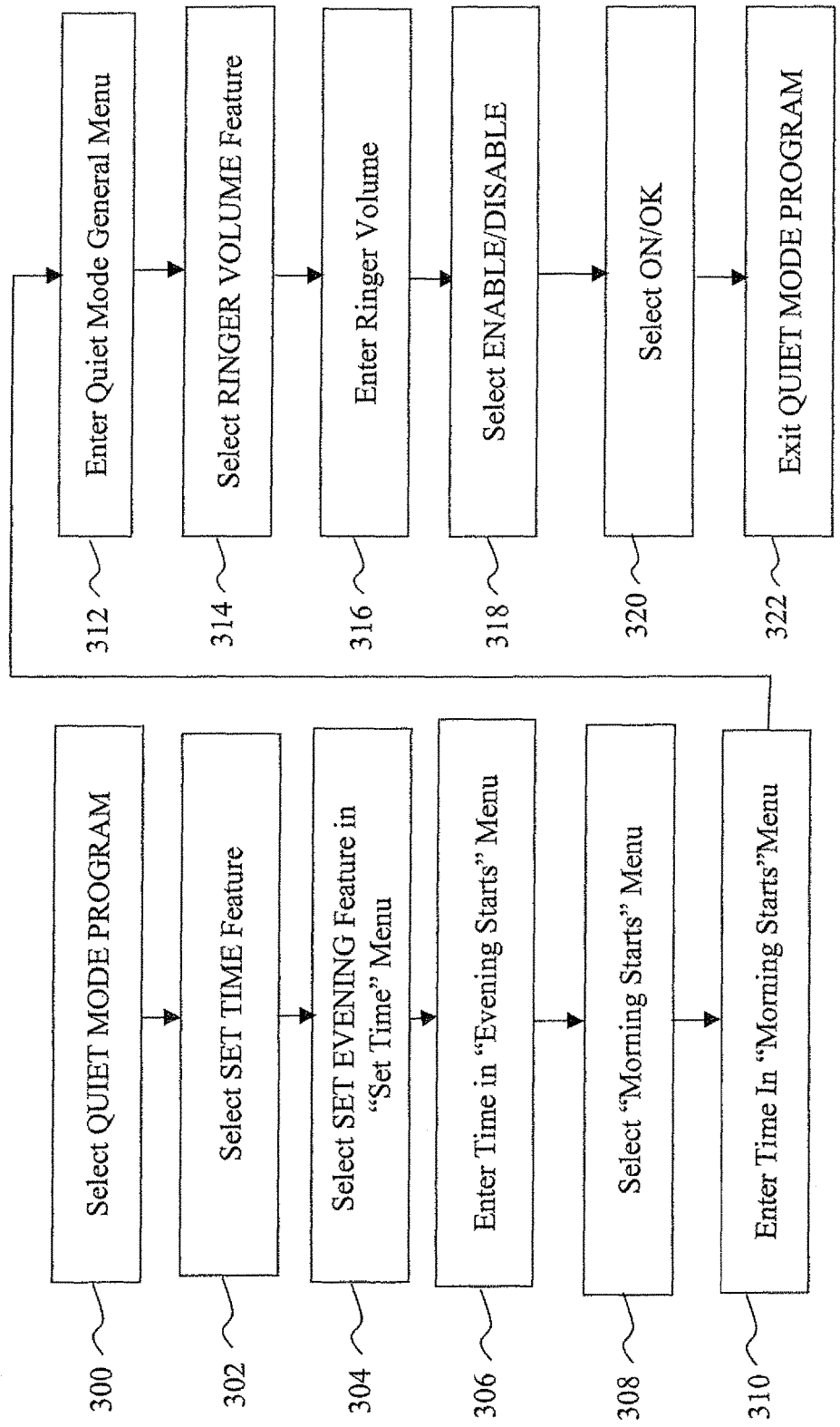
FIG. 3 illustrates a method for enabling quiet mode operation of a telephone system according to another embodiment.

FIG. 3 illustrates one embodiment that provides a method to program a quiet mode operation in handset 120. In step 300, a user selects QUIET MODE PROGRAM in menu 1. This causes the main quiet mode program menu 2 to open.

In step 302, a user selects the SET TIME option in menu 2, which causes menu 6 to appear.

In step 304, the user selects the first item in menu 6, SET EVENING, which then causes menu 8 to appear. If the user desires to reduce the telephone system noise each evening at 9 o'clock, the user might then enter 9:00 pm, as illustrated in step 306.

Using one of two routes, the user may enter the "Morning starts" menu 10 in step 308. In a first method, the user simply selects NEXT in menu 8. Alternatively, the user may exit menu 8 by selecting OK, in which case, menu 6 reappears. The user then selects the MORNING STARTS feature in menu 6 to enter menu 10.

In step 310, the user enters 8:00 am and OK, which causes a return to menu 6. In step 312 the user returns to general menu 2 by choosing the OK selection in menu 6.

Having chosen the period for quiet mode operation, the user may then proceed to modify parameters associated with a signaling device whose noise level is to be lowered during the quiet mode period. In one embodiment, in step 314, the user chooses RINGER VOLUME selection in menu 2, which causes menu 12, with the heading RINGER VOLUME, to open. The user may then enter the appropriate volume desired for the ringer during the evening and overnight period, by selecting up or down options in menu 12.

In step 316, the user selects a volume of "1" (assuming "1" is a lower level tone and "0" is mute) and enters OK, which prompts a return to general menu 2.

In step 318, the user chooses ENABLE/DISABLE selection and is brought to "enable quiet night" menu 4.

In step 320, the user then selects ON which sets a flag to enable quiet mode operation when the flag is tripped. The user then selects OK, and is returned to menu 2.

In step 322, the further OK selection then effects an exit of the quiet mode general menu 2, and sets the flag to enable the telephone system to enter into quiet mode operation at the preset time.

Figure 4:
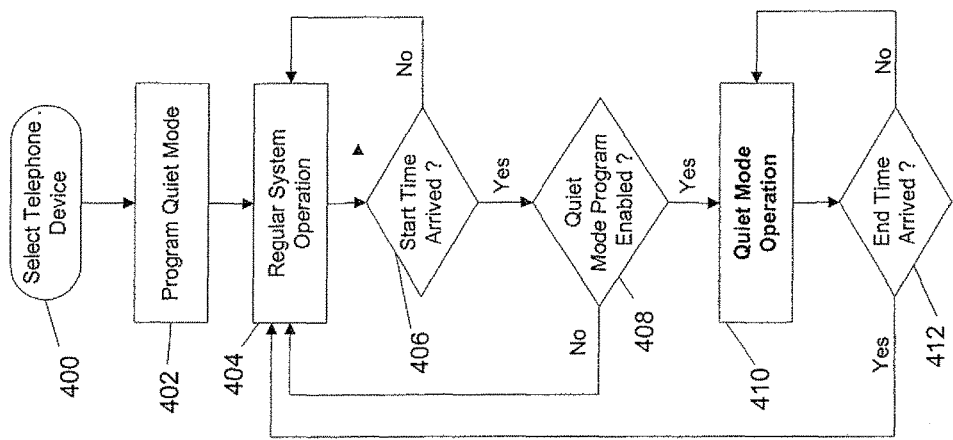
FIG. 4 illustrates the operation of a telephone system according to one embodiment

FIG. 4 provides an flowchart illustrating the operation of a telephone system according to one embodiment. In step 400, the user selects a handset or base station of telephone system 100 to program.

In step 402, the user enters the quiet mode program menu and enters instructions according to steps 300-322 above, for example. After completing programming of the quiet mode operation, the user exits form menu 2.

If the user exits the program during the daytime, in step 404 the telephone system assumes "regular" operation with the signaling features operating at normal settings. However, in step 406, after the user exits from programming the system, a signal is sent to the telephone system when the start time for quiet mode operation arrives.

In step 408, if the user previously programmed the system to enable quiet mode operation, the signal sent to the telephone system trips a flag to initiate the beginning of quiet mode operation.

Thus, in step 410, following the example of FIG. 3, at 9:00 pm the system enters quiet mode operation and telephone ringer volume automatically reduces to "1".

Subsequently, at 8:00 am the following day, a signal is sent to the phone system 100, which trips a flag to disable the quiet mode operation. In step 412, the quiet mode operation ends and the ringer volume is returned to a default value or to the stored daytime value. Without further intervention, the system status returns to step 404.

The present disclosure also provides for automatic disabling or quieting of additional signaling features commonly associated with telephone systems. These include, but are not limited to, voice announce features, keypad tone, error tone, out of range signal, speaker telephone and answering machines. In addition, it will be obvious to one of ordinary skill in the art, that a signaling feature may encompass a device that generates an auditory sound, a vibrating device, or a light emitting device.

Figure 5:
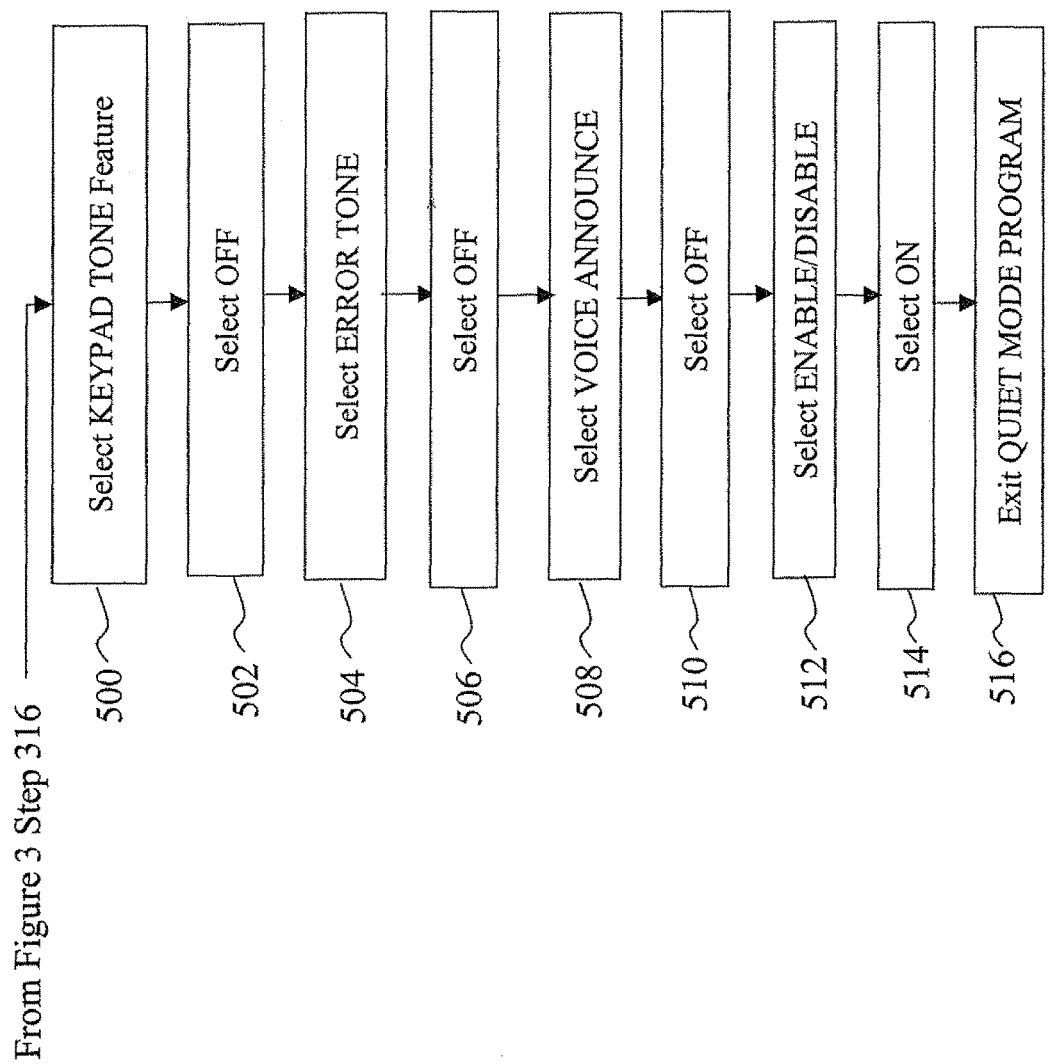
FIG. 5 illustrates a method for controlling specific features of a telephone system during quiet mode operation of a telephone system according to another embodiment.
Figure 6:
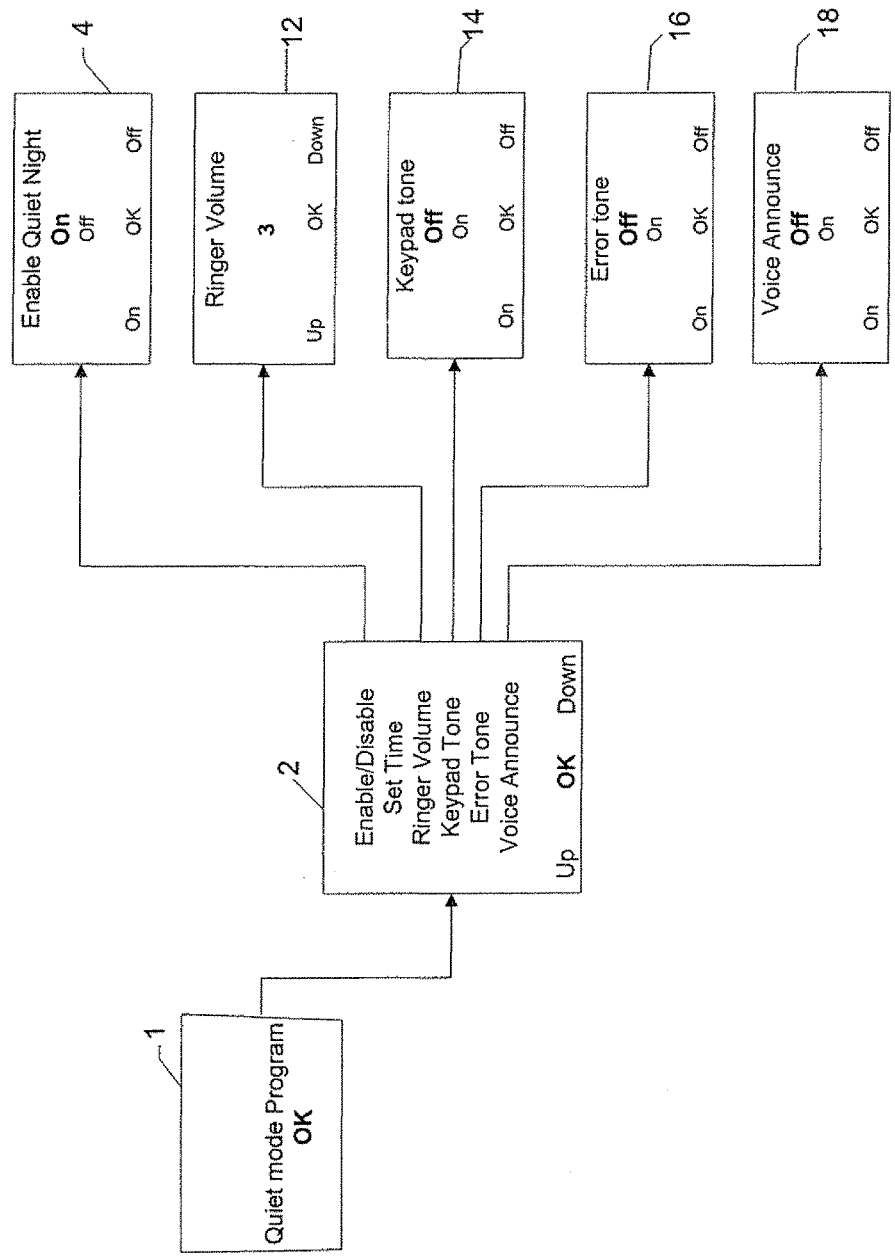
FIG. 6 is a depiction of a program for setting the operation of telephone system features according to one embodiment.

In another embodiment, disclosed in FIG. 5, initially steps similar to 300-316 disclosed in FIG. 3 are performed. In step 500, the user selects KEYPAD TONE, which prompts menu 14 to appear, as illustrated in FIG. 6.

In step 502, the user selects OFF and OK, and is returned to general menu 2.

Following a procedure similar to step 500, in step 504 the user selects ERROR TONE, which displays menu 16.

In step 506, in menu 16, with a heading of "Error Tone", the user selects OFF. After subsequently selecting OK, the user is returned to general menu 2.

In step 508, the user selects the VOICE ANNOUNCE choice in menu 2. This causes menu 18 to appear.

If the user desires to have the "voice announce" feature disabled during quiet mode operation, the user selects OFF in step 510 and is returned to general menu 2.

In step 512, the user selects ENABLE/DISABLE which brings up menu 4.

If the user desires that the telephone system be subsequently enabled for quiet mode operation after program exit, in step 514 the user selects ON, followed by OK, which returns the user to quiet mode general menu 2.

Subsequently, the user may exit quiet mode programming, as illustrated in step 516.

Figure 7:
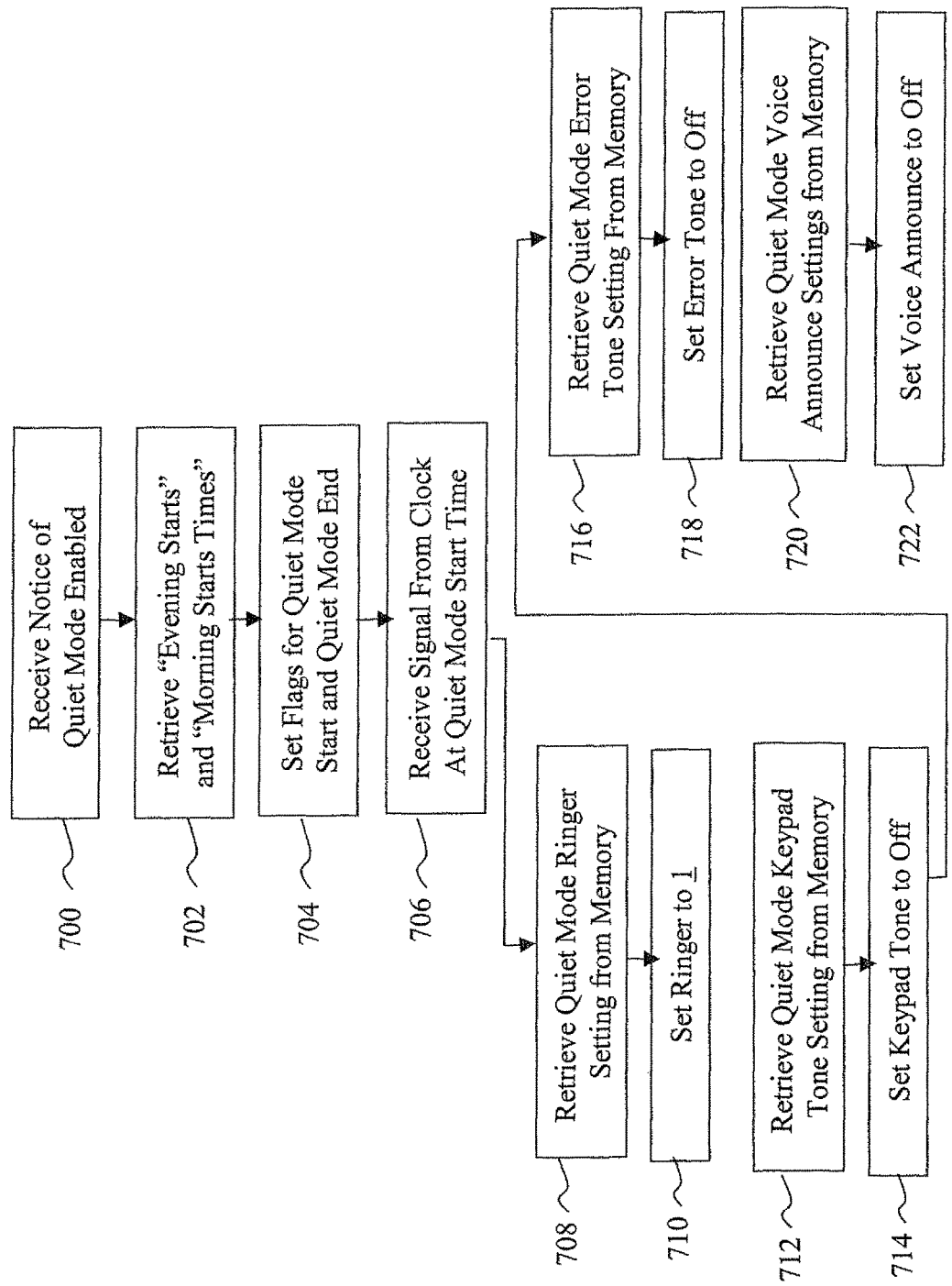
FIG. 7 illustrates details of a telephone system operation according to another embodiment.

FIG. 7 discloses details of quiet mode telephone operation according to one embodiment. In step 700, processor 134 receives a signal that quiet mode operation is enabled.

In step 702, processor 134 retrieves from memory 133, the "evening starts" and "morning starts" settings programmed in steps 306 and 310, respectively.

In step 704, processor 134 then sets a flag to start quiet mode operation when a signal is received that 9:00 pm has arrived. Another flag is set to end quiet mode operation when a signal is received that 8:00 am has arrived.

In step 706, clock 136 sends a signal to processor 134 indicating the arrival of 9:00 pm, causing the preset flag to trip. Processor 134 then performs a series of operations to initiate quiet mode operation.

In step 708, processor 134 retrieves from memory 133 the quiet mode ringer setting volume of "1", that was entered in step 316.

In step 710, the quiet mode ringer volume setting is forwarded by processor 134 to a controller 138. The controller 138 then sets the ringer volume to "1".

Similarly, in step 712, processor 134 retrieves the quiet mode keypad tone setting "OFF" that was entered in step 502.

In step 714, the quiet mode keypad tone setting is forwarded by processor 134 to controller 138, which turns off the telephone keypad tone.

In steps 716-722, the error tone and voice announce features are turned off using the same set of procedures as for the keypad tone. It will be apparent to those of ordinary skill in the art that the exact sequence of steps 708 to 722 may be varied.

When the clock signals 9:00 pm, the switch to quiet mode operation of various signaling features may be performed in any sequence with no discernible effect noticed by the user, because of the rapidity at which chips 134 and 138 operate.

According to the embodiment disclosed in FIG. 7, telephone 120 will operate in a quiet mode until the following morning at 8:00 am. At 8:00 am, clock 136 sends processor 134 a signal which triggers the flag to reset the ringer volume, error tone, keypad tone, and voice announce features, to daytime operation.

Figure 8:
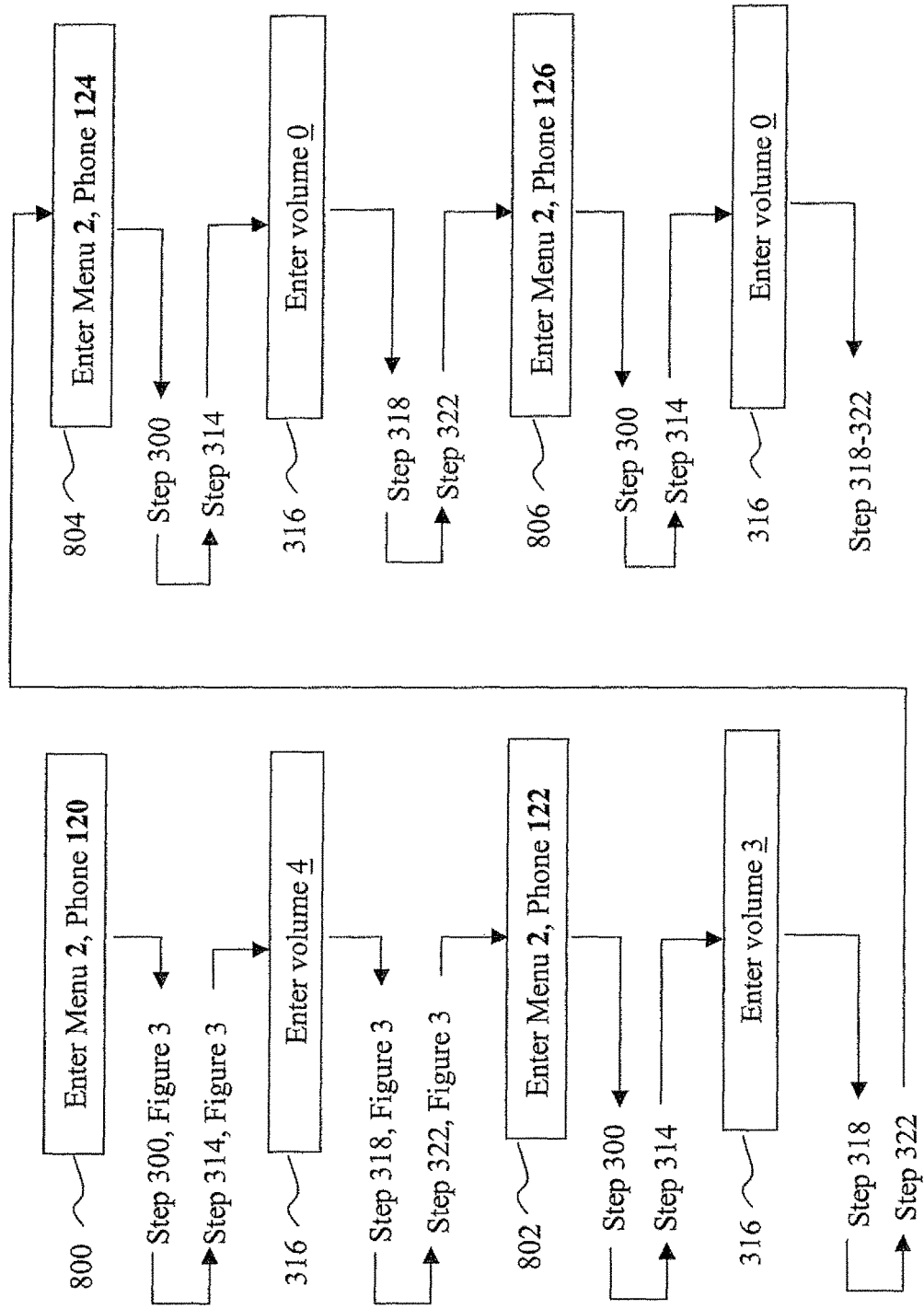
FIG. 8 illustrates a method for varying the operation of a specific signaling feature among a plurality of telephones, according to another embodiment.

FIG. 8 discloses an embodiment, which provides for individualized quiet mode operation for each telephone in a group of associated telephones. For example, for household telephone handsets using the same telephone number, a user may wish to vary the nighttime ringer volume depending on the proximity of a given handset to a bedroom. A telephone handset in the living room may be kept at a higher volume than those in bedroom areas, so that a person who is downstairs in the evening may be alerted to a call without disturbing persons already in bed. In step 800, a user selects living room handset 120, and proceeds to program quiet mode operation according to steps similar to steps 300-314 disclosed in FIG. 3.

In step 316, the user enters "4" for ringer volume, and then proceeds in a similar fashion to steps 318-322, including exiting the quiet mode program in step 322.

In step 802, the user selects TV room handset 122, and repeats programming steps 300-314 However, because of the closer proximity to an upstairs bedroom, at step 316 the user enters "3" for ringer volume, before proceeding to enable the telephone and exit the program.

In step 804, the user selects upstairs handset 124, and proceeds through steps 300-322. In the case of handset 124, the user selects volume "0" in step 316 to ensure quiet for any upstairs occupants after 9:00 pm.

In step 806, the user selects bedroom handset 126 and proceeds through steps 300-322 in an identical fashion to that used for handset 124. Upon completion of the steps disclosed in FIG. 8, when an incoming telephone call is received between the hours of 9:00 pm and 8:00 am, handsets 124 and 126 remain silent, while the ringer volume of handset 122 is "3" and that of handset 124 is "4".

Figure 9:
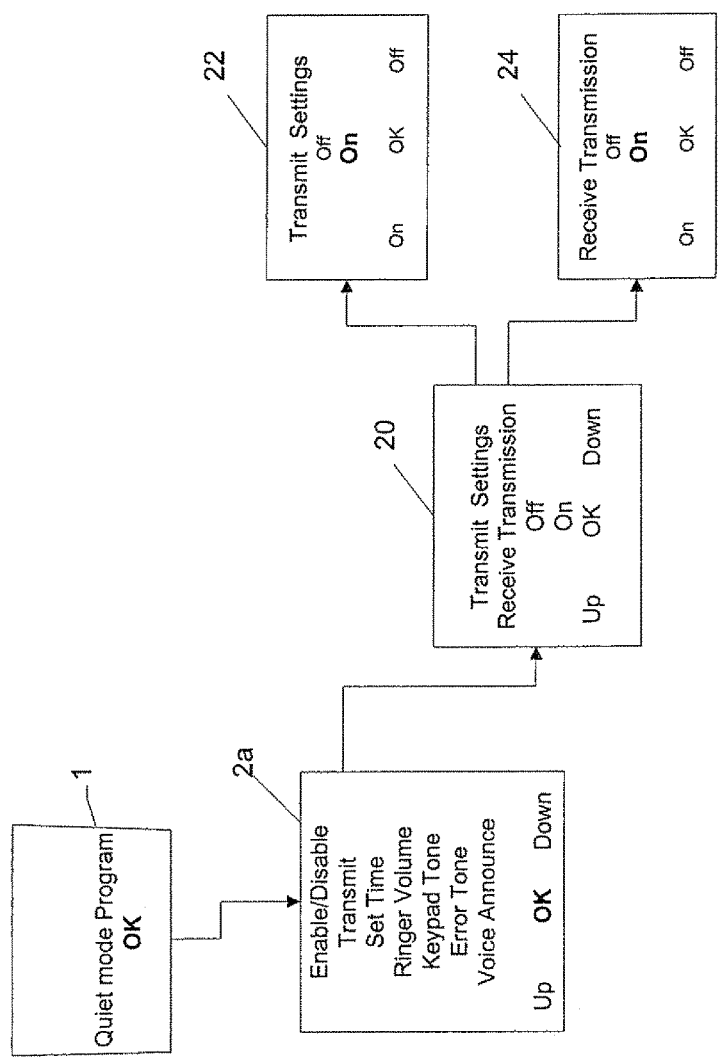
FIG. 9 is a depiction of a program for the setting of quiet mode operation in a plurality of telephones according to one embodiment.

In a household in which many telephone handsets are associated with a single telephone base station, and the user wishes to establish the same quiet mode settings in all the telephone handsets, it is desirable to be able to program all the handsets at once. FIG. 9 illustrates an embodiment which provides a method for setting and modifying the quiet mode operation in a set of telephone handsets by use of a single device. During telephone programming, when a user chooses the TRANSMIT selection in menu 2a, menu 20 opens. Menu 20 provides the user with two selections, TRANSMIT SETTINGS and RECEIVE TRANSMISSION. When a user choose the former, menu 22 opens, in which a user may then select ON and OK to enable a transmit mode. When the user subsequently exits menu 2a with quiet mode operation enabled, the quiet mode settings programmed in the user's telephone are sent to the other telephones, which will then subsequently operate according to the transmitted program settings received.

Figure 10:
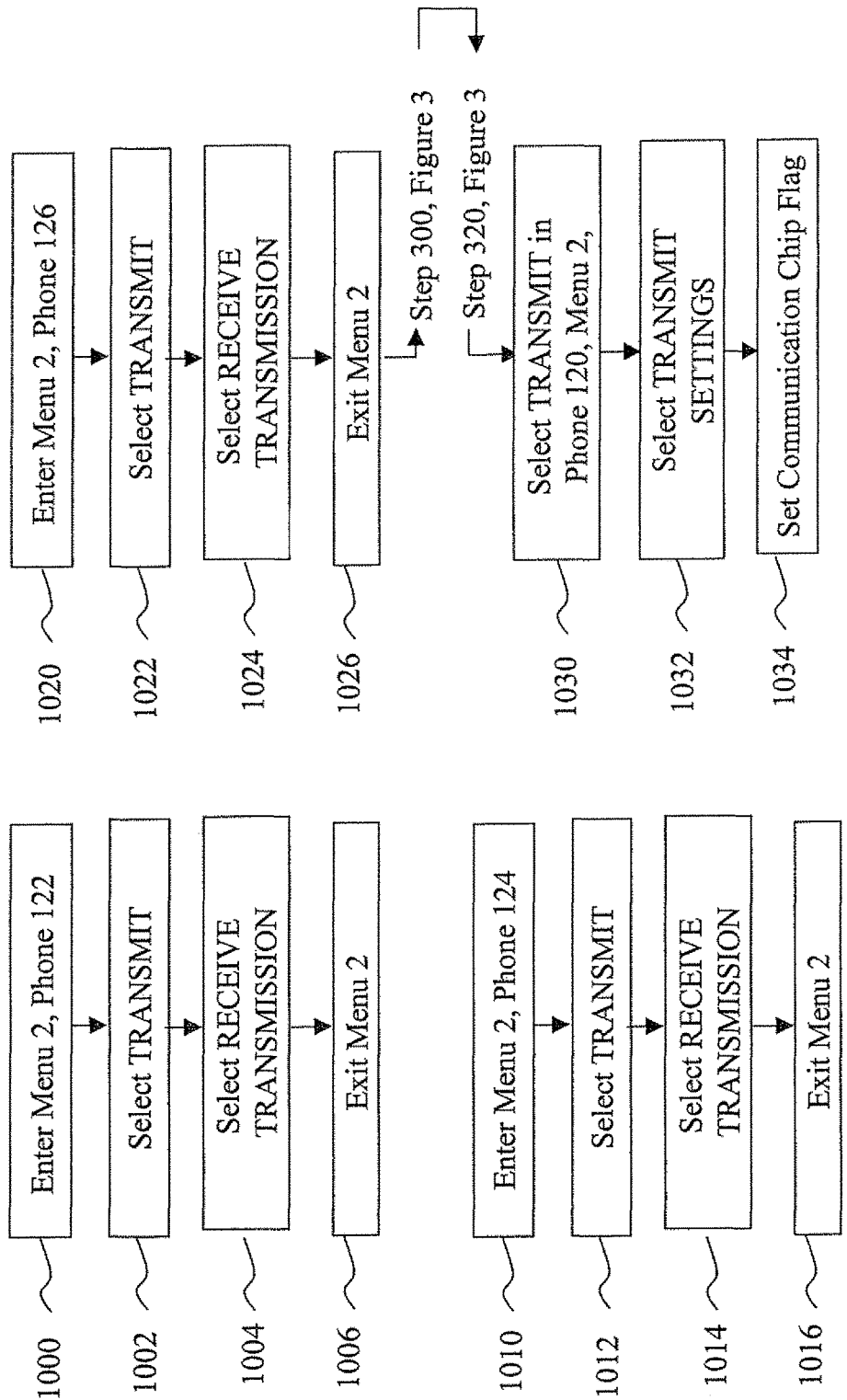
FIG. 10 illustrates a method for enabling the setting of quiet mode operation in a plurality of telephones according to one embodiment.

FIG. 10 illustrates detailed steps for programming a set of telephones to operate according to a set of quiet mode instructions entered in a single telephone, according to another embodiment. In step 1000, the user selects handset 122 and enters menu 2a.

In step 1002, the user selects TRANSMIT from menu 2a, which opens menu 20. In addition to the TRANSMIT SETTINGS selection, the RECEIVE TRANSMISSION selection, when chosen, provides for a user to enable the device to receive a transmission from another device.

In step 1004, the user selects RECEIVE TRANSMISSION, causing menu 24 to open. The user then selects ON and OK.

In step 1006, the user exits the quiet mode program in handset 122. Upon exit of the program, a flag is set in processor 134 of handset 122, which enables the handset to receive and store transmitted information from another telephone in system 100.

In steps 1010-1016 the user selects handset 124 and repeats the procedure employed in steps 1000-1006.

In steps 1020-1026, the user similarly programs handset 126 to enable it to receive transmitted information.

The user then chooses telephone handset 120 and proceeds to program handset 120 according to the steps 300-320 outlined in FIG. 3. In step 1030, the user selects TRANSMIT from menu 2a in handset 120, and in step 1032 selects TRANSMIT SETTINGS, and OK, returning to menu 2a. In step 1034, processor 134 sets a flag to transmit the programmed settings of handset 120, which may be tripped, for instance, when program menu 2 is exited.

Figure 11:
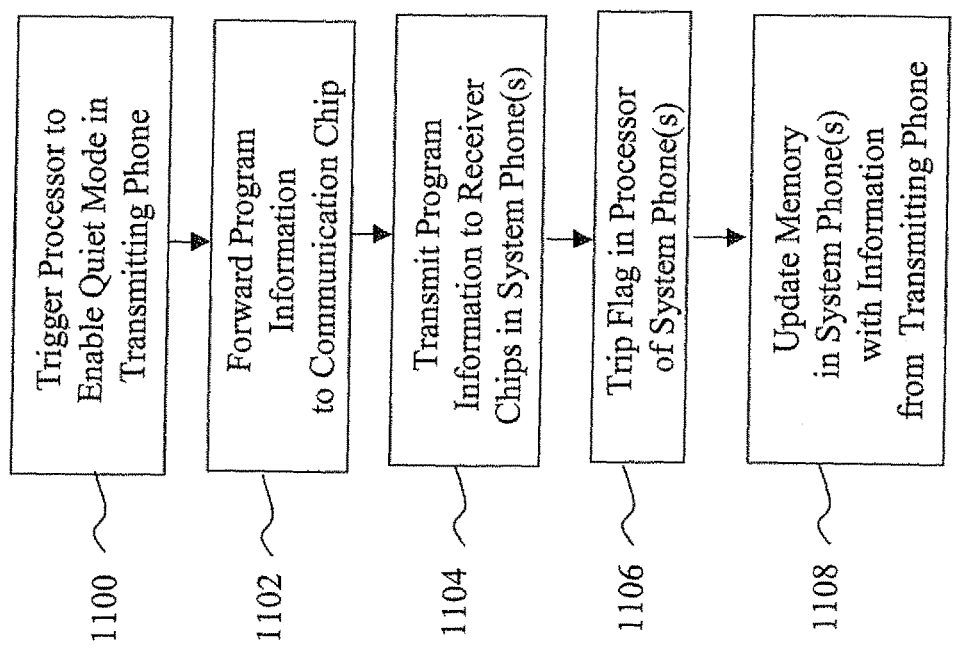
FIG. 11 illustrates details of a telephone system operation according to still another embodiment.

FIG. 11 illustrates the automatic transmission of quiet mode program settings from a first telephone in a telephone system, to all telephones enabled to receive the transmission, in accordance with a further embodiment. In step 1100, a user exits menu 2, in telephone handset 120, sending a message to processor 134 to enable quiet mode operation of handset 120.

In step 1102, the transmit flag is tripped causing processor 134 to retrieve quiet mode program information stored in memory 133 of handset 120. The information is then forwarded to communication chip 140.

In step 1104, communication chip 140 sends the quiet mode program information to receivers 142 in system handsets 122, 124, and 126.

In step 1106, the information received is forwarded to processors 134, causing the preset flags in processors 134 to be tripped.

In step 1108, processors 134 forward the received information to memories 133, which update the existing quiet mode settings in handsets 122, 124, and 126, according to the information received from handset 120. It will be obvious to one of ordinary skill, that the programming procedures and telephone operations outlined in FIGS. 10 and 11 could be performed using any telephone handset or base station in system 100 as the transmission source. For example, a user could select base station 110, enter new quiet mode program instructions and send them to telephone handsets 120, 122, 124, and 126, in system 100. The quiet mode operation of the handsets would then be updated in accordance with the selections made in base station 110, provided that the RECEIVE TRANSMISSION setting remained on in each of the handsets.

Figure 12:
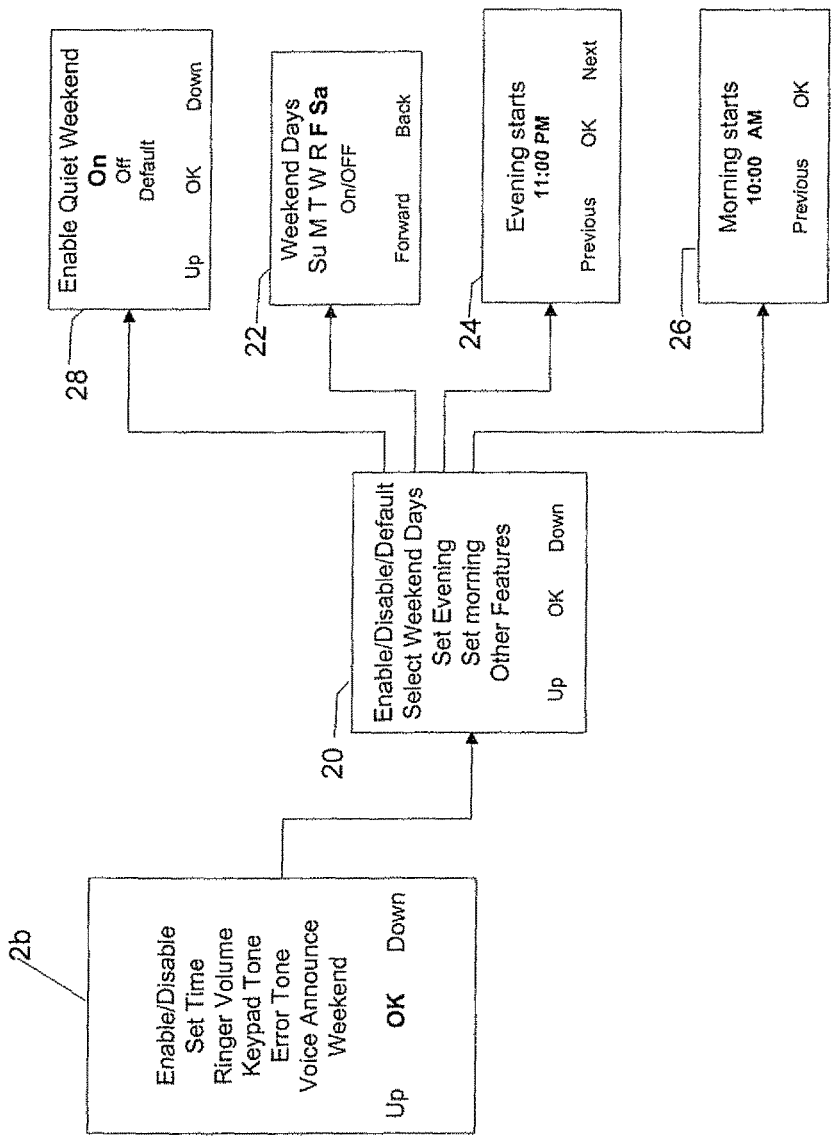
FIG. 12 depicts a program for the setting of quiet mode weekend operation according to a further embodiment.
Figure 13:
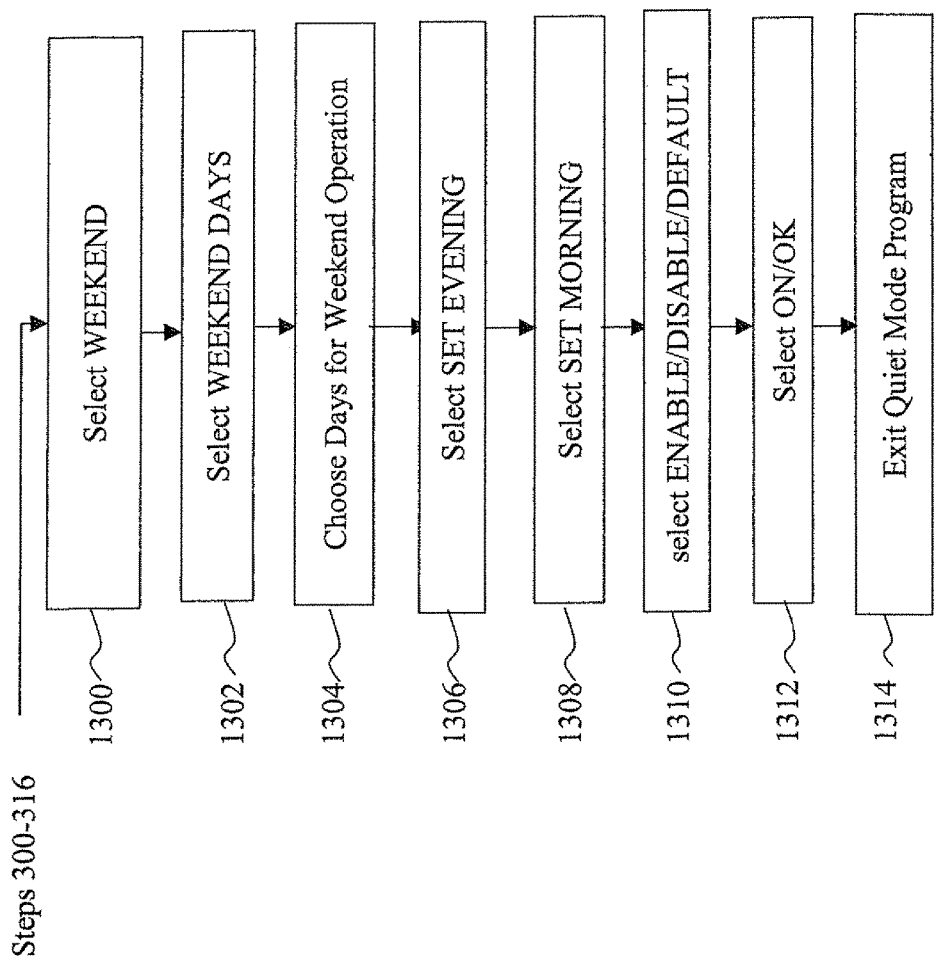
FIG. 13 illustrates a method for enabling the setting of weekend quiet mode operation according to a further embodiment

A further embodiment provides a method for tailoring the period of quiet mode operation of a telephone system according to the day of the week. As disclosed in FIG. 12, a user is provided with additional "weekend" menu 20 accessible from general menu 2*b*. In one embodiment, depicted in FIG. 13, a user initially proceeds according to steps 300-316 illustrated in FIG. 3.

After evening and morning times are set to delineate the period for quiet mode operation of the telephone system, the user is returned to general menu 2*b*. If a user desires to alter the quiet mode period, for example, on the weekend, she then proceeds in step 1300 to select the WEEKEND feature in menu 2*b*, which brings up menu 20.

In step 1302, the user chooses SELECT WEEKEND DAYS selection in menu 20, which causes menu 22 to open. The user may then choose specific days for which the quiet mode operation will be altered.

In step 1304, a user selects, for example, Friday and Saturday. By doing so, the user indicates that Friday and Saturday are to receive specialized instructions with respect to the quiet mode operation. The user exits menu 22 by selecting OK and is returned to menu 20.

In step 1306, the user then selects SET EVENING, which causes menu 24 to be displayed. Under the "evening starts" heading, the user then enters 11:00 pm, and exits menu 24, which brings her back to menu 20.

In step 1308, the user selects SET MORNING, is brought to menu 26, and, following an analogous procedure to step 1306, enters a "morning starts" time of 10:00 am. At this point, the user proceeds to exit menu 26 and is brought back to menu 20.

In step 1310, the user selects ENABLE/DISABLE/DEFAULT and is brought into "enable quiet weekend" menu 28. Under "normal" operations, in which the telephone system quiet mode period is the same for every day, the DEFAULT option in menu 28 is selected. In order to activate the separate quiet mode operation periods selected for the weekend, the user must select ON in menu 28.

After selecting ON and OK, in step 1312, the user is brought back to general menu 2*b*.

In step 1314, the user selects OK in menu 2*b*, and exits the program, whereupon distinct weekday and weekend quiet mode operations are enabled.

In a preferred embodiment, after exiting the program, and without further user intervention, the telephone system enters quiet mode operation at 9:00 pm on every weekday, and exits quiet mode operation at 8:00 am the following weekday. Preferably clock 136 includes a calendar function so that on Friday and Saturday, flags separate from the weekday flags, can be set and tripped according to the quiet mode start and end time programmed for Friday and Saturday. Thus, every weekend, the telephone system does not enter quiet mode operation until 11:00 pm, and does not exit quiet mode until 10:00 am the following morning. On Sunday evening, the system enters quiet mode at 9:00 pm, and exits quiet mode at 8:00 am Monday.

If, after programming a distinct a weekend quiet mode operation, the user subsequently desires to temporarily suspend the weekend quiet mode function, the user may enter menu 28, and select DEFAULT, in which case, the telephone system quiet mode operation will be the same on all days. The user may alternatively select OFF to disable quiet mode operation completely during a weekend period.

Figure 14:
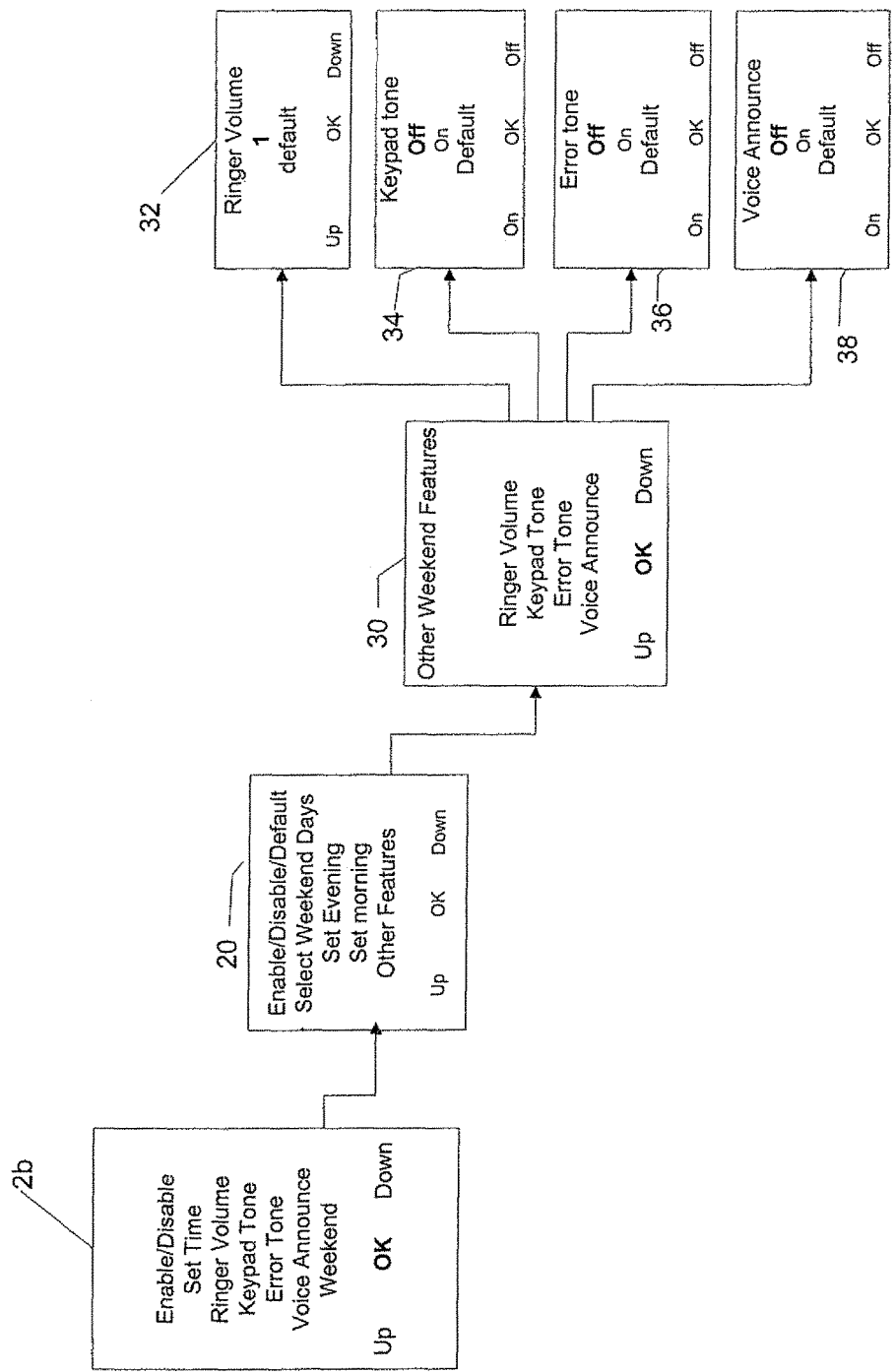
FIG. 14 depicts a program for the setting of quiet mode weekend operation according to a still further embodiment.
Figure 15:
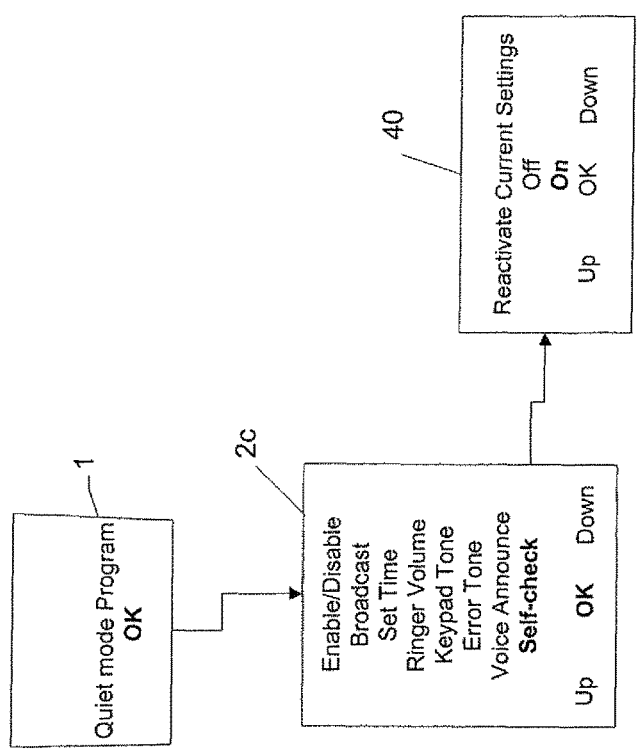
FIG. 15 illustrates a program for automatic checking of current quiet mode settings according to an alternative embodiment.

In another embodiment, disclosed in FIG. 14, a user is provided with a menu to customize the operation of signaling features during weekend mode operation. Selection of the OTHER FEATURES choice in menu 20, causes menu 30 to appear, which lists signaling features that may be modified individually for operation during the weekend. For instance, if a user desires that the ringer operate at a volume of 1 during quiet mode weekend operation, the RINGER VOLUME feature is selected, which brings up menu 32. After, a volume of "1" is selected, and menu 32 is exited, the user is returned to menu 30. By selecting KEYPAD TONE, ERROR TONE, or VOICE ANNOUNCE in menu 30, sub-menus 34,36, or 38, are activated, allowing the user to modify the operation of the given feature as desired.

In each sub-menu a DEFAULT selection is provided, which, if selected, causes the weekend quiet mode operation of a given feature to default to the condition selected for weekday operation. For example, if a user wishes to have the same night time ringer volume setting on weekends as during the week, the DEFAULT choice in menu 32 is selected. The weekend quiet mode ringer volume is then determined by the value entered in menu 12 (Illustrated in FIG. 5). Furthermore, the weekend quiet mode ringer volume would change in accordance with any changes entered in menu 12.

In another embodiment, a method is provided for a device to self-check quiet mode status whenever required. For example, after programming and activating quiet mode settings in a device or series of devices, one or more of the devices may enter a power saver mode or be out of range of other devices within a phone system. In a preferred embodiment, upon entering quiet mode programming, a user is provided with menu 2*c*, which includes a "self-check" selection. Selection of the "self-check" feature activates menu 40, which displays the choice "reactivate current settings". While programming a chosen device, for example a handset, a user may choose "reactivate current settings" before exiting menu 40. Subsequently, after the user exits menu 2*c* and quiet mode operation is enabled, the handset may enter a "sleep" or power saver mode. When the handset subsequently receives an incoming signal, for instance, a ringer signal, it sends a query to the system clock and also to its stored memory to retrieve the currently-programmed quiet mode settings. For example, if the ringer is programmed for a setting of "2" after 9:00 pm, and an incoming signal is received at 100:00 pm, the handset retrieves the current time, and sets the ringer volume to "2", and the handset begins to ring.

The foregoing disclosure of the preferred embodiments has been presented for purposes of illustration and description. It is not intended to be exhaustive or to limit the disclosure to the precise forms disclosed.

Many variations and modifications of the embodiments described herein will be apparent to one of ordinary skill in the art in light of the above disclosure. The scope of the disclosure is to be defined only by the claims appended hereto, and by their equivalents.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present disclosure.

What is claimed:

1. A method, comprising:
storing, in a first handset of a telephone system, located in a room of a structure and connected to a base unit, quiet mode settings that specify a start time and an end time for a quiet mode signaling feature;
enabling the quiet mode settings on the first handset of the telephone system;
wirelessly transmitting, from the first handset of the telephone system to a second handset of the telephone system, located in a different room of the structure and connected to the base unit, the quiet mode settings that specify the start time and the end time for the quiet mode signaling feature, wherein the first handset and the second handset are using a common telephone number;
updating quiet mode settings for the quiet mode signaling feature in the second handset in response to receiving quiet mode settings from the first handset, wherein the first handset individually self-checks the status of its quiet mode settings and the second handset of the telephone system individually self-checks the status of its quiet mode settings;
storing a specific set of days, a second start time, a second end time, and intensity settings for the quiet mode; and
altering a signal intensity of a particular quiet mode signaling feature during the quiet mode period specified by the specific set of days, the second start time, and the second end time, wherein the quiet mode signaling feature and the particular quiet mode signaling feature are the same feature, and wherein a signal intensity of the particular quiet mode signaling feature in the specific set of days is different from a signal intensity of the particular quiet mode signaling feature during other days.

2. The method of claim 1, further comprises:
receiving, with the second handset, a signal from the first handset indicating that the quiet mode signaling feature is enabled;
retrieving, with the second handset, the start time and the end time from a memory of the second handset;
detecting arrival of the start time;
retrieving from the memory of the second handset quiet mode settings for the quiet mode signaling feature; and
setting operation of the quiet mode signaling feature in the second handset according to the retrieved quiet mode settings.

3. The method of claim 1, further comprising:
storing quiet mode settings for a telephone ringer of the second handset in the second handset; and
configuring the telephone ringer of the second handset per the quiet mode settings in response to detecting arrival of the start time.

4. The method of claim 1, further comprising:
storing quiet mode settings for a voice announce device of the second handset in the second handset; and
configuring the voice announce device of the second handset per the quiet mode settings in response to detecting arrival of the start time.

5. The method of claim 1, further comprising:
storing quiet mode settings for a keypad tone of the second handset in the second handset; and
configuring the keypad tone of the second handset per the quiet mode settings in response to detecting arrival of the start time.

6. The method of claim 1, further comprising:
storing quiet mode settings for an error tone of the second handset in the second handset; and
configuring the error tone of the second handset per the quiet mode settings in response to detecting arrival of the start time.

7. The method of claim 1, further comprising:
storing quiet mode settings for an answering machine associated with the second handset; and
configuring the answering machine per the quiet mode settings in response to detecting arrival of the start time.

8. The method of claim 1, further comprising:
storing quiet mode settings for a speaker telephone associated with the second handset; and
configuring the speaker telephone per the quiet mode settings in response to detecting arrival of the start time.

9. A telephone system, comprising:
a first telephone handset located in a room of a structure and connected to a base unit and a second telephone handset located in a different room of the structure and connected to the base unit, wherein the first handset and the second handset are using a common telephone number;
wherein the first telephone comprises:
a user interface configured to receive quiet mode settings that specify a start time and an end time for a quiet mode on both the first telephone and the second telephone, and receive a request to transmit the quiet mode settings to the second telephone;
a memory that stores a specific set of days, a second start time, a second end time, and intensity settings for the quiet mode; and
a processor that alters a signal intensity of a particular quiet mode signaling feature during the quiet mode period specified by the specific set of days, the second start time, and the second end time, wherein the quiet mode signaling feature and the particular quiet mode signaling feature are the same feature, and wherein a signal intensity of the particular quiet mode signaling feature in the specific set of days is different from a signal intensity of the particular quiet mode signaling feature during other days; and a communication interface configured to wirelessly transmit the quiet mode settings in a single transmission to the second telephone in response to the received request; and wherein the second telephone comprises:

a receiver configured to receive the quiet mode settings from the first telephone;

a memory that stores a specific set of days, a third start time, a third end time, and intensity settings for the received quiet mode settings; and a processor that alters a signal intensity of a particular quiet mode signaling feature during the quiet mode period specified by the specific set of days, the third start time, and the third end time, wherein the quiet mode signaling feature and the particular quiet mode signaling feature are the same feature, and wherein a signal intensity of the particular quiet mode signaling feature in the specific set of days is different from a signal intensity of the particular quiet mode signaling feature during other days;

a clock configured to trigger and terminate the quiet mode based on the received quiet mode settings in the single transmission; and wherein the first handset individually self-checks the status of its quiet mode settings and the second handset of the telephone system individually self-checks the status of its quiet mode settings.

10. The telephone system of claim 9, wherein the signal comprises an audible sound.

11. The telephone system of claim 9, wherein:

the second telephone further comprises a base station and a handset; and the signaling device is a component of either the handset or the base station of the second telephone.

12. The telephone system of claim 9, wherein:

the second telephone further comprises an answering device; and the signaling device is a component of the answering device.

13. The telephone system of claim 9, wherein:

the second telephone further comprises a voice announce device; and the signaling device is a component of the voice announce device.

14. A method, comprising:

enabling quiet mode settings on a first handset of a telephone system, located in a room of a structure and connected to a base unit;

receiving, with the first telephone of the telephone system, input that requests quiet mode settings to be wirelessly transmitted to a second telephone of the telephone system, located in a different room of the structure and connected to the base unit, wherein the first handset and the second handset are using a common telephone number;

wirelessly transmitting, from the first telephone to the second telephone, first quiet mode settings for a first signaling feature of a second telephone, and second quiet mode settings for a second signaling feature of the second telephone in response to said receiving input; and in response to receiving the first quiet mode settings, configuring the first signaling feature of the second telephone per the first quiet mode settings;

in response to receiving the second quiet mode settings, configuring the second signaling feature of the second telephone per the second quiet mode settings, and wherein the first handset individually self-checks the status of its quiet mode settings and the second handset of the telephone system individually self-checks the status of its quiet mode settings;

storing a specific set of days, a second start time, a second end time, and intensity settings for the quiet mode; and altering a signal intensity of a particular quiet mode signaling feature during the quiet mode period specified by the specific set of days, the second start time, and the second end time, wherein the quiet mode signaling feature and the particular quiet mode signaling feature are the same feature, and wherein a signal intensity of the particular quiet mode signaling feature in the specific set of days is different from a signal intensity of the particular quiet mode signaling feature during other days.

15. The method of claim 14, further comprising:

wirelessly transmitting, from the first telephone to the second telephone, a signal indicating that quiet mode operation is enabled; and enabling the first quiet mode settings and the second quiet mode settings in the second telephone in response to the second telephone receiving the signal indicating that quiet mode operation is enabled.

16. The method of claim 14, wherein the first signaling feature and the second signaling feature each comprise a different one of a telephone ringer, voice announce device, a keypad tone, an error tone, an answering machine, a speaker telephone, a visible light signal, and a vibration.

* * * * *